US012742909B2

(12) United States Patent
Kato et al.

(10) Patent No.: US 12,742,909 B2
(45) Date of Patent: Sep. 22, 2026

(54) OPTICAL LENS THAT CONTAINS THERMOPLASTIC RESIN

(71) Applicant: MITSUBISHI GAS CHEMICAL COMPANY, INC., Tokyo (JP)

(72) Inventors: Noriyuki Kato, Tokyo (JP); Katsushi Nishimori, Tokyo (JP); Atsushi Motegi, Tokyo (JP); Kentaro Ishihara, Tokyo (JP); Kiyoshiro Fukui, Tokyo (JP)

(73) Assignee: MITSUBISHI GAS CHEMICAL COMPANY, INC, Tokyo (JP)

( * ) Notice: Subject to any disclaimer, the term of this patent is extended or adjusted under 35 U.S.C. 154(b) by 130 days.

(21) Appl. No.: 18/709,191

(22) PCT Filed: Nov. 28, 2022

(86) PCT No.: PCT/JP2022/043650
§ 371 (c)(1),
(2) Date: May 10, 2024

(87) PCT Pub. No.: WO2023/100778
PCT Pub. Date: Jun. 8, 2023

(65) Prior Publication Data

US 2025/0110258 A1 Apr. 3, 2025

(30) Foreign Application Priority Data

Nov. 30, 2021 (JP) ................................ 2021-194390

(51) Int. Cl.
*G02B 1/04* (2006.01)
*C08G 64/06* (2006.01)

(52) U.S. Cl.
CPC ............. *G02B 1/041* (2013.01); *C08G 64/06* (2013.01)

(58) Field of Classification Search
CPC ................................ G02B 1/041; C08G 64/06
See application file for complete search history.

(56) References Cited

U.S. PATENT DOCUMENTS 11,072,573 B2 7/2021 Reuter et al.
2015/0285954 A1 10/2015 Ishizuka et al.
(Continued)

FOREIGN PATENT DOCUMENTS

EP 4 506 392 A1 2/2025
JP 2000-248058 9/2000
(Continued)

OTHER PUBLICATIONS

Supplementary European Search Report dated Feb. 21, 2025 in European family member application No. 22901211.7.
(Continued)

*Primary Examiner* — Bijan Ahvazi
(74) *Attorney, Agent, or Firm* — GREENBLUM & BERNSTEIN, P.L.C.

(57) ABSTRACT

According to the present invention, there can be provided an optical lens, comprising a thermoplastic resin containing a constituent unit (A) derived from a monomer represented by the following general formula (1), and a constituent unit (B) derived from BPEF or BPPEF represented by each of the following structural formulae, wherein the molar ratio (A:B) between the constituent unit (A) and the constituent unit (B) is 5:95 to 79:21:

(1)

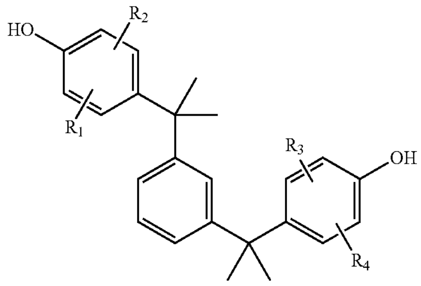

wherein $R_1$ to $R_4$ each independently represent a hydrogen atom, a halogen atom, an optionally branched alkyl group containing 1 to 10 carbon atoms, an alkoxy group containing 1 to 10 carbon atoms, or an aryl group containing 6 to 15 carbon atoms, and

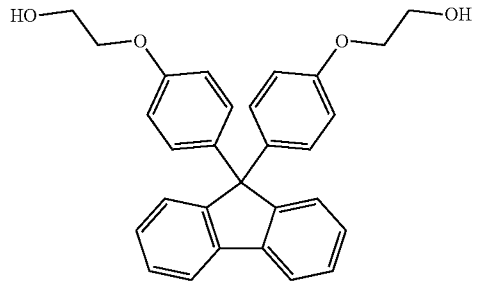

BPEF

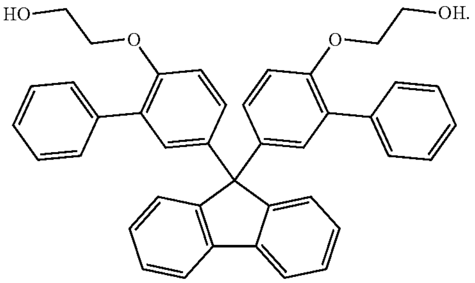

BPPEF

7 Claims, No Drawings

(56) References Cited

U.S. PATENT DOCUMENTS

| | | | | |
|---|---|---|---|---|
| 2017/0044312 | A1* | 2/2017 | Kato | C08K 5/005 |
| 2018/0312689 | A1* | 11/2018 | Kato | C08G 64/06 |
| 2019/0055351 | A1 | 2/2019 | Kato et al. | |

FOREIGN PATENT DOCUMENTS

| | | | | | |
|---|---|---|---|---|---|
| JP | 2004-331688 | A | | 11/2004 | |
| JP | 2014054710 | A | * | 3/2014 | H10P 72/7602 |
| JP | 2018-2893 | A | | 1/2018 | |
| JP | 2018-2894 | A | | 1/2018 | |
| JP | 2018-2895 | A | | 1/2018 | |
| JP | 2018-59074 | A | | 4/2018 | |
| WO | WO-2014054710 | A1 | * | 4/2014 | C08L 69/00 |
| WO | 2014/073496 | A1 | | 5/2014 | |
| WO | 2015/170691 | A1 | | 11/2015 | |
| WO | 2017/078071 | A1 | | 5/2017 | |
| WO | 2017/078073 | A1 | | 5/2017 | |

OTHER PUBLICATIONS

International Search Report dated Feb. 7, 2023 in International Bureau of WIPO Patent Application No. PCT/JP2022/043650 with an English translation thereof.

Written Opinion dated Feb. 7, 2023 in International Bureau of WIPO Patent Application No. PCT/JP2022/043650 with an English translation thereof.

* cited by examiner

OPTICAL LENS THAT CONTAINS THERMOPLASTIC RESIN

TECHNICAL FIELD

The present invention relates to an optical lens comprising a thermoplastic resin. More specifically, the present invention relates to an optical lens comprising a polycarbonate resin.

BACKGROUND ART

As materials for optical elements used in the optical systems of various types of cameras such as a camera, a film-integrated camera and a video camera, optical glasses or optical resins have been used. Such optical glasses are excellent in heat resistance, transparency, dimensional stability, chemical resistance and the like. However, the optical glasses are problematic in terms of high material costs, poor formability and low productivity.

On the other hand, an optical lens consisting of an optical resin is advantageous in that it can be produced in a large amount by injection molding, and as materials having a high refractive index for use in camera lenses, polycarbonate, polyester carbonate, and polyester resins, etc. have been used.

When such an optical resin is used as an optical lens, the used optical resin is required to have heat resistance, transparency, low water absorbability, chemical resistance, low birefringence, moist-heat resistance, etc., in addition to optical properties such as refractive index and Abbe number. In particular, in recent years, optical lenses having a high refractive index and high heat resistance have been required, and thus, various resins have been developed (Patent Literatures 1 to 5).

Moreover, a thermoplastic resin made from 2,2'-bis(2-hydroxyethoxy)-1,1'-binaphthalene as a raw material has excellent optical properties and is useful as a material for various types of optical applications (Patent Literature 6). However, due to various molding processing and the expansion of usage environments, the improvement of a mass change percentage and a dimensional change percentage has been required.

CITATION LIST

Patent Literature

Patent Literature 1: JP Patent Publication (Kokai) No. 2018-2893 A
Patent Literature 2: JP Patent Publication (Kokai) No. 2018-2894 A
Patent Literature 3: JP Patent Publication (Kokai) No. 2018-2895 A
Patent Literature 4: JP Patent Publication (Kokai) No. 2018-59074 A
Patent Literature 5: International Publication WO2017/078073
Patent Literature 6: International Publication WO2014/073496

SUMMARY OF INVENTION

Technical Problem

It is an object of the present invention to provide an optical lens comprising a thermoplastic resin that is excellent in optical properties such as refractive index and Abbe number, and is also excellent in mass change percentage and dimensional change percentage.

Solution to Problem

As a result of intensive studies directed towards solving the conventional problem, the present inventors have found that an optical lens comprising a thermoplastic resin that is excellent in optical properties such as refractive index and Abbe number, and is also excellent in mass change percentage and dimensional change percentage, can be obtained by mixing a specific amount of a diol compound having a specific structure into the raw materials of the resin, thereby completing the present invention.

Specifically, the present invention includes the following aspects.

<1> An optical lens, comprising a thermoplastic resin containing a constituent unit (A) derived from a monomer represented by the following general formula (1), and a constituent unit (B) derived from BPEF or BPPEF represented by the following structural formula, wherein the molar ratio (A:B) between the constituent unit (A) and the constituent unit (B) is 5:95 to 79:21:

(1)

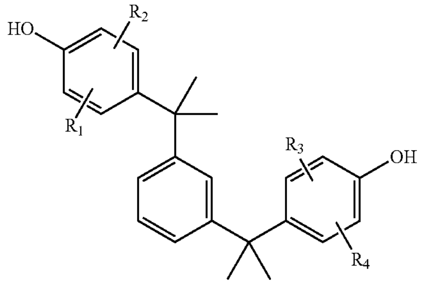

wherein $R_1$ to $R_4$ each independently represent a hydrogen atom, a halogen atom, an optionally branched alkyl group containing 1 to 10 carbon atoms, an alkoxy group containing 1 to 10 carbon atoms, or an aryl group containing 6 to 15 carbon atoms, and

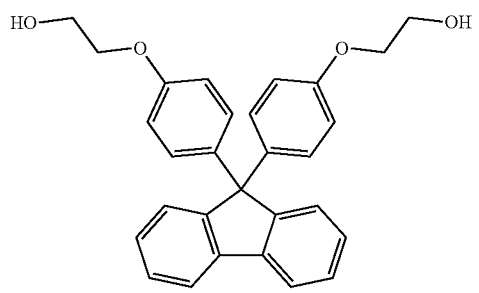

BPEF

-continued

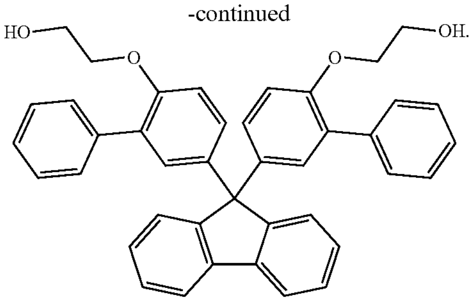

BPPEF

<2> The optical lens according to the above <1>, wherein the thermoplastic resin further comprises a constituent unit (C) derived from BCFL represented by the following structural formula:

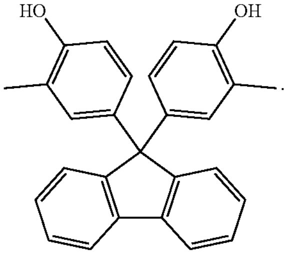

BCFL

<3> The optical lens according to the above <1> or <2>, wherein the percentage of the constituent unit (A) in all constituent units in the thermoplastic resin is 5% to 50% by mole.

<4> The optical lens according to any one of the above <1> to <3>, wherein the percentage of the constituent unit (B) in all constituent units in the thermoplastic resin is 11% to 95% by mole.

<5> The optical lens according to the above <2>, wherein the percentage of the constituent unit (C) in all constituent units in the thermoplastic resin is 0% to 50% by mole.

<6> The optical lens according to any one of the above <1> to <5>, wherein the thermoplastic resin has Tg of 120° C. to 160° C.

<7> The optical lens according to any one of the above <1> to <6>, wherein the thermoplastic resin has a refractive index (nD) of 1.600 to 1.660.

<8> The optical lens according to any one of the above <1> to <7>, wherein the thermoplastic resin has an Abbe number of 21.0 to 27.0.

<9> The optical lens according to any one of the above <1> to <8>, wherein the thermoplastic resin has a mass change percentage of 0.47% or less.

<10> The optical lens according to any one of the above <1> to <9>, wherein the thermoplastic resin has a dimensional change percentage of 0.060% or less.

Advantageous Effects of Invention

According to the present invention, there can be provided an optical lens comprising a thermoplastic resin that is excellent in optical properties such as refractive index and Abbe number, and is also excellent in mass change percentage and dimensional change percentage.

DESCRIPTION OF EMBODIMENTS

Hereinafter, the present invention will be described in detail by exemplifying synthetic examples, examples, and the like, but the present invention is not limited to the exemplified synthetic examples, examples, and the like. The methods described below can be changed to any methods within a range that does not greatly deviate from the contents of the present invention.

<Thermoplastic Resin>

The optical lens of the present invention comprises a thermoplastic resin containing a constituent unit (A) derived from a monomer represented by the following general formula (1), and a constituent unit (B) derived from BPEF (9,9-bis[4-(2-hydroxyethoxy)phenyl]fluorene) or BPPEF (9,9-bis[4-(2-hydroxyethoxy)-3-phenylphenyl]fluorene) represented by each of the structural formulae shown below.

[Constituent Unit (A)]

(1)

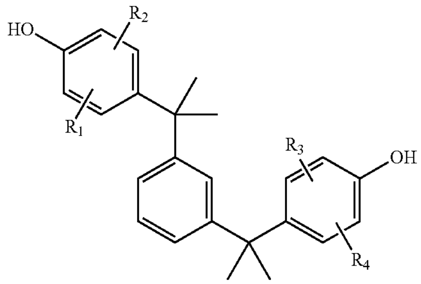

In the above general formula (1), $R_1$ to $R_4$ each independently represent a hydrogen atom, a halogen atom, an optionally branched alkyl group containing 1 to 10 (preferably 1 to 6, and more preferably 1 to 3) carbon atoms, an alkoxy group containing 1 to 10 (preferably 1 to 6, and more preferably 1 to 3) carbon atoms, or an aryl group containing 6 to 15 (preferably 6 to 10, and more preferably 6) carbon atoms. More preferably, $R_1$ to $R_4$ each independently represent a hydrogen atom, a methyl group, or a phenyl group.

In the present invention, the monomer represented by the above general formula (1) is particularly preferably BPM (1,3-bis[2-(4-hydroxyphenyl)-2-propyl]benzene) represented the following structural formula. This compound is also referred to as bisphenol M.

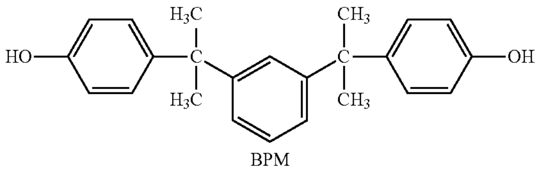

BPM

[Constituent Unit (B)]

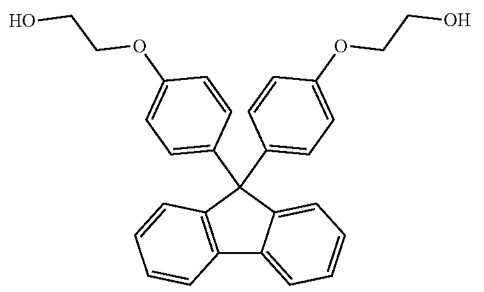

BPEF

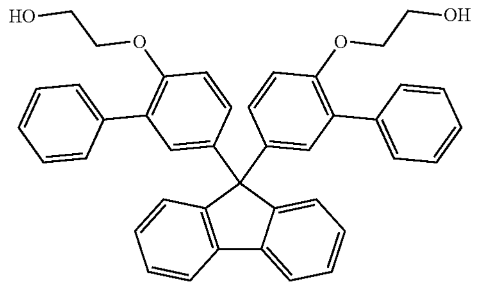

BPPEF

In the present invention, the molar ratio (A:B) between the constituent unit (A) and the constituent unit (B) is 5:95 to 79:21, preferably 8:92 to 77:23, and more preferably 10:90 to 70:30.

In the present invention, as BPEF and BPPEF, either commercially available products or synthesized products may be used.

[Constituent Unit (C)]

In a preferred embodiment of the present invention, the thermoplastic resin further comprises a constituent unit (C) derived from BCFL (biscresol fluorene) represented by the following structural formula.

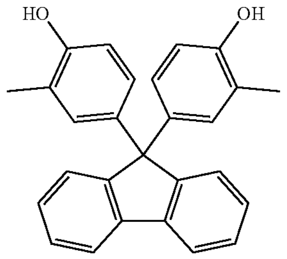

BCFL

In a preferred embodiment of the present invention, the percentage of the constituent unit (A) in all constituent units in the thermoplastic resin is 5% to 50% by mole, and more preferably 8% to 48% by mole. The percentage of the constituent unit (B) in all constituent units in the thermoplastic resin is 11% to 95% by mole, and more preferably 14% to 92% by mole. The percentage of the constituent unit (C) in all constituent units in the thermoplastic resin is 0% to 50% by mole, and more preferably 0% to 38% by mole.

The thermoplastic resin used in the optical lens of the present invention is not particularly limited, and examples thereof may include a polyester resin, a polycarbonate resin, a polyester carbonate resin, an epoxy resin, a polyurethane resin, a polyacrylic acid ester resin, and a polymethacrylic acid ester resin. The thermoplastic resin is preferably a polycarbonate resin, a polyester resin or a polyester carbonate resin, and is more preferably a polycarbonate resin.

In a preferred embodiment of the present invention, the total percentage of the constituent units (A), (B) and (C) in all constituent units in the thermoplastic resin is preferably 80% to 100% by mole, more preferably 90% to 100% by mole, and particularly preferably 100% by mole.

That is to say, the thermoplastic resin used in the present invention may comprise a constituent unit derived from an aliphatic dihydroxy compound and a constituent unit derived from an aromatic dihydroxy compound, which are generally used as constituent units of a polycarbonate resin or a polyester carbonate resin, as well as the constituent units (A) to (C), within a range in which the effects of the present invention are not impaired.

Specifically, various compounds are exemplified as such aliphatic dihydroxy compounds. Particular examples thereof may include 1,4-cyclohexane dimethanol, tricyclodecane dimethanol, 1,3-adamantane dimethanol, 2,2-bis(4-hydroxycyclohexyl)-propane, 3,9-bis(2-hydroxy-1,1-dimethylethyl)-2,4,8,10-tetraoxaspiro[5.5]undecane, 2-(5-ethyl-5-hydroxymethyl-1,3-dioxan-2-yl)-2-methylpropan-1-ol, isosorbide, 1,3-propanediol, 1,4-butanediol, and 1,6-hexanediol.

Various compounds are exemplified as such aromatic dihydroxy compounds. Particular examples thereof may include 2,2-bis(4-hydroxyphenyl) propane [bisphenol A], bis(4-hydroxyphenyl) methane, 1,1-bis(4-hydroxyphenyl) ethane, 2,2-bis(4-hydroxy-3,5-dimethylphenyl) propane, 4,4'-dihydroxydiphenyl, bis(4-hydroxyphenyl)cycloalkane, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ketone, and bisphenoxyethanolfluorene.

In one embodiment of the present invention, it is also preferable that the thermoplastic resin further comprises a constituent unit derived from at least one monomer selected from the following monomer group.

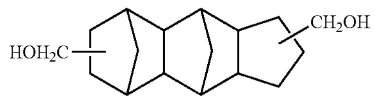

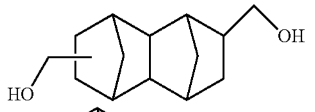

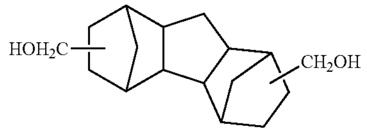

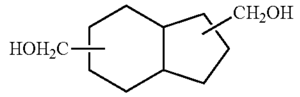

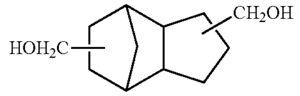

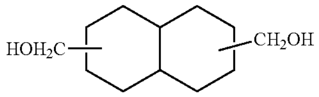

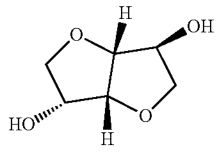

-continued

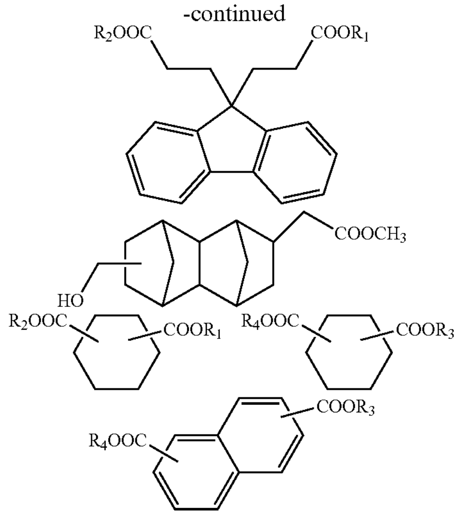

In the above formulae, $R_1$ and $R_2$ each independently represent a hydrogen atom, a methyl group or an ethyl group; and $R_3$ and $R_4$ each independently represent a hydrogen atom, a methyl group, an ethyl group or alkylene glycol containing 2 to 5 carbon atoms.

The polycarbonate resin of one preferred embodiment of the present invention may comprise, as impurities, an alcoholic compound that may be generated as a by-product upon the production thereof, such as a phenolic compound, or a diol component or a carbonic acid diester that has not reacted and remains, in some cases.

Such an alcoholic compound such as a phenolic compound, and such a carbonic acid diester, which are comprised as impurities, may cause a reduction in the strength of the resulting molded body or generation of odors. Accordingly, the smaller the contents of these compounds, the better.

The content of the remaining phenolic compound is preferably 3000 ppm by mass or less, more preferably 1000 ppm by mass or less, particularly preferably 300 ppm by mass or less, with respect to 100% by mass of the polycarbonate resin.

The content of the remaining diol component is preferably 1000 ppm by mass or less, more preferably 100 ppm by mass or less, and particularly preferably 10 ppm by mass or less, with respect to 100% by mass of the polycarbonate resin.

The content of the remaining carbonic acid diester is preferably 1000 ppm by mass or less, more preferably 100 ppm by mass or less, and particularly preferably 10 ppm by mass or less, with respect to 100% by mass of the polycarbonate resin.

In particular, it is preferable that the contents of compounds such as phenol and t-butyl phenol are small, and it is preferable that the contents of these compounds are within the above-described range.

The content of a phenolic compound remaining in the polycarbonate resin can be measured by a method of analyzing a phenolic compound extracted from the polycarbonate resin, using gas chromatography.

The content of an alcoholic compound remaining in the polycarbonate resin can also be measured by a method of analyzing an alcoholic compound extracted from the polycarbonate resin, using gas chromatography.

The contents of a diol component and a carbonic acid diester remaining in the polycarbonate resin can also be measured by a method of extracting these compounds from the polycarbonate resin, and then analyzing them using gas chromatography.

The contents of a by-product alcoholic compound such as a phenolic compound, a diol component, and a carbonic acid diester may be reduced to such an extent that these compounds are undetectable. However, from the viewpoint of productivity, the polycarbonate resin may comprise very small amounts of these compounds in a range in which the compounds do not impair the effects of the present invention. In addition, plasticity can be improved upon the melting of the resin, if the resin may comprise very small amounts of the compounds.

The content of the remaining phenolic compound, diol component or carbonic acid diester may each be, for example, 0.01 ppm by mass or more, 0.1 ppm by mass or more, or 1 ppm by mass or more, with respect to 100% by mass of the polycarbonate resin.

The content of the remaining alcoholic compound may be, for example, 0.01 ppm by mass or more, 0.1 ppm by mass or more, or 1 ppm by mass or more, with respect to 100% by mass of the polycarbonate resin.

Besides, the contents of the by-product alcoholic compound such as a phenolic compound, the diol component and the carbonic acid diester in the polycarbonate resin can be regulated to be within the above-described ranges by appropriately adjusting conditions for polycondensation or the setting of apparatuses. Otherwise, the contents of these compounds can also be regulated by determining conditions for an extrusion step after completion of the polycondensation.

For example, the amount of the remaining by-product alcoholic compound such as a phenolic compound is related to the type of carbonic acid diester used in the polymerization of the polycarbonate resin, the temperature applied to the polymerization reaction, the polymerization pressure, etc. By adjusting these conditions, the amount of the remaining by-product alcoholic compound such as a phenolic compound can be reduced.

For example, when the polycarbonate resin is produced using dialkyl carbonate such as diethyl carbonate, the molecular weight is hardly increased, and low-molecular-weight polycarbonate is thereby obtained, so that the content of an alcoholic compound generated as a by-product tends to be increased. Such alkyl alcohol has high volatility, and thus, if it remains in the polycarbonate resin, the moldability of the resin tends to be deteriorated. In addition, when the amount of the remaining by-product alcoholic compound such as a phenolic compound is large, it is likely that problems regarding odor occur upon the molding of the resin, or it is also likely that the cleavage reaction of a resin skeleton progresses upon compounding, and a reduction in the molecular weight thereby occurs. Therefore, the content of the by-product alcoholic compound remaining in the obtained polycarbonate resin is preferably 3000 ppm by mass or less, with respect to the amount of the polycarbonate resin (100% by mass). The content of the remaining alcoholic compound is preferably 3000 ppm by mass or less, more preferably 1000 ppm by mass or less, and particularly preferably 300 ppm by mass or less, with respect to 100% by mass of the polycarbonate resin.

The polycarbonate resin of one preferred embodiment of the present invention can be produced in the presence of a polycondensation catalyst, namely, a basic compound catalyst, a transesterification catalyst or a mixed catalyst consisting of both of them.

Examples of the basic compound catalyst may include an alkali metal compound, an alkaline-earth metal compound, and a nitrogen-containing compound.

Examples of the alkali metal compound may include the organic acid salts, inorganic salts, oxides, hydroxides, hydrides or alkoxides of alkali metals. Specific examples of the alkali metal compound used herein may include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium borophenylate, sodium benzoate, potassium benzoate, cesium benzoate, lithium benzoate, disodium hydrogen phosphate, dipotassium hydrogen phosphate, dilithium hydrogen phosphate, disodium phenyl phosphate, the disodium salts, dipotassium salts, dicesium salts or dilithium salts of bisphenol A, and the sodium salts, potassium salts, cesium salts or lithium salts of phenol. From the viewpoints of catalytic effects, costs, the amount of goods in circulation, the influence on the hue of the resin, etc., sodium carbonate and sodium hydrogen carbonate are preferable.

Examples of the alkaline-earth metal compound may include the organic acid salts, inorganic salts, oxides, hydroxides, hydrides or alkoxides of the alkaline-earth metal compounds. Specific examples of the alkaline-earth metal compound used herein may include magnesium hydroxide, calcium hydroxide, strontium hydroxide, barium hydroxide, magnesium hydrogen carbonate, calcium hydrogen carbonate, strontium hydrogen carbonate, barium hydrogen carbonate, magnesium carbonate, calcium carbonate, strontium carbonate, barium carbonate, magnesium acetate, calcium acetate, strontium acetate, barium acetate, magnesium stearate, calcium stearate, calcium benzoate, and magnesium phenyl phosphate.

Examples of the nitrogen-containing compound may include quaternary ammonium hydroxides and salts thereof, and amines. Specific examples of the nitrogen-containing compound used herein may include: quaternary ammonium hydroxides having alkyl or aryl groups, etc., such as tetramethylammonium hydroxide, tetraethylammonium hydroxide, tetrapropylammonium hydroxide, tetrabutylammonium hydroxide and trimethylbenzylammonium hydroxide, tertiary amines such as triethylamine, dimethylbenzylamine and triphenylamine, secondary amines such as diethylamine and dibutylamine, primary amines such as propylamine and butylamine, imidazoles such as 2-methylimidazole, 2-phenylimidazole and benzoimidazole, and bases or basic salts, such as ammonia, tetramethylammonium borohydride, tetrabutylammonium borohydride, tetrabutylammonium tetraphenylborate and tetraphenylammonium tetraphenylborate.

As transesterification catalysts, the salts of zinc, tin, zirconium, and lead are preferably used, and these salts can be used alone or in combination. In addition, these salts may also be used in combination with the aforementioned alkali metal compound or alkaline-earth metal compound.

Specific examples of the transesterification catalyst used herein may include zinc acetate, zinc benzoate, zinc 2-ethylhexanoate, tin (II) chloride, tin (IV) chloride, tin (II) acetate, tin (IV) acetate, dibutyltin dilaurate, dibutyltin oxide, dibutyltin dimethoxide, zirconium acetylacetonate, zirconium oxyacetate, zirconium tetrabutoxide, lead (II) acetate, and lead (IV) acetate.

Such a catalyst is preferably used at a ratio of $1\times10^{-9}$ to $1\times10^{-3}$ moles, and is more preferably used at a ratio of $1\times10^{-7}$ to $1\times10^{-4}$ moles, with respect to a total of 1 mole of diol compounds.

<Physical Properties of Thermoplastic Resin>

(1) Refractive Index (nD)

In one embodiment of the present invention, the thermoplastic resin is characterized in that it has a high refractive index, and the refractive index is preferably 1.600 to 1.660, and more preferably 1.610 to 1.650. In the present invention, the refractive index can be measured by the method described in the after-mentioned Examples.

(2) Abbe Number (ν)

In one embodiment of the present invention, the Abbe number of the thermoplastic resin is preferably 21.0 to 27.0, and more preferably 22.0 to 26.5. In the present invention, the Abbe number can be measured by the method described in the after-mentioned Examples.

(3) Glass Transition Temperature (Tg)

In one embodiment of the present invention, the thermoplastic resin is characterized in that it has high heat resistance, and the glass transition temperature (Tg) is preferably 120° C. to 160° C., and more preferably 125° C. to 155° C. In the present invention, the glass transition temperature can be measured by the method described in the after-mentioned Examples.

(4) Polystyrene-Converted Weight Average Molecular Weight (Mw)

In one embodiment of the present invention, the polystyrene-converted weight average molecular weight of the thermoplastic resin is preferably 10,000 to 100,000, more preferably 20,000 to 70,000, and particularly preferably 30,000 to 60,000.

(5) Mass Change Percentage (%)

In one embodiment of the present invention, the thermoplastic resin is characterized in that it has a low mass change percentage, and the mass change percentage of the present thermoplastic resin is preferably 0.47% or less, and more preferably 0.43% or less. The lower limit value is not particularly limited, and it is approximately 0.20%. In the present invention, the mass change percentage can be measured by the method described in the after-mentioned Examples.

(6) Dimensional Change Percentage (%)

In one embodiment of the present invention, the thermoplastic resin is characterized in that it has a low dimensional change percentage, and the dimensional change percentage of the present thermoplastic resin is preferably 0.060% or less, and more preferably 0.050% or less. The lower limit value is not particularly limited, and it is approximately 0.010%. In the present invention, the dimensional change percentage can be measured by the method described in the after-mentioned Examples.

<Thermoplastic Resin Composition>

The optical lens of the present invention may comprise a thermoplastic resin composition comprising the aforementioned thermoplastic resin and additives. The thermoplastic resin composition of the present embodiment may also comprise a resin other than the thermoplastic resin comprising the aforementioned constituent units (A) and (B) or the aforementioned constituent units (A), (B) and (C), in a range in which such a resin does not impair the desired effects of the present embodiment. Such a resin is not particularly limited, and it may be, for example, at least one resin selected from the group consisting of a polycarbonate resin, a polyester resin, a polyester carbonate resin, a (meth)acrylic resin, a polyamide resin, a polystyrene resin, a cycloolefin resin, an acrylonitrile-butadiene-styrene copolymer resin, a vinyl chloride resin, a polyphenylene ether resin, a polysulfone resin, a polyacetal resin, and a methyl methacrylate-styrene copolymer resin. Various types of known resins can be used as such resins, and one type of such resin alone can be added to, or a combination of two or more types of such resins can be added to the thermoplastic resin composition.

[Antioxidant]

The thermoplastic resin composition preferably comprises an antioxidant as an additive described above.

As such an antioxidant, the thermoplastic resin composition preferably comprises at least one of a phenolic antioxidant and a phosphite-based antioxidant.

Examples of the phenolic antioxidant may include 1,3,5-tris(3,5-di-tert-butyl-4-hydroxyphenylmethyl)-2,4,6-trimethylbenzene, 1,3,5-tris(3,5-di-tert-butyl-4-hydroxybenzyl)-1,3,5-triazine-2,4,6 (1H,3H,5H)-trione, 4,4',4"-(1-methylpropanyl-3-ylidene)tris(6-tert-butyl-m-cresol), 6,6'-di-tert-butyl-4,4'-butylidenedi-m-cresol, octadecyl 3-(3,5-di-tert-butyl-4-hydroxyphenyl) propionate, pentaerythritol-tetrakis[3-(3,5-di-tert-butyl-4-hydroxyphenyl) propionate], 3,9-bis {2-[3-(3-tert-butyl-4-hydroxy-5-methylphenyl) propionyloxy]-1,1-dimethylethyl}-2,4,8,10-tetraoxospiro[5.5] undecane, and pentaerythritol-tetrakis[3-(3,5-di-tert-butyl-4-hydroxyphenyl) propionate]. Among these, pentaerythritol-tetrakis[3-(3,5-di-tert-butyl-4-hydroxyphenyl) propionate] is preferable.

Examples of the phosphite-based antioxidant may include 2-ethylhexyl diphenyl phosphite, isodecyl diphenyl phosphite, triisodecyl phosphite, triphenyl phosphite, 3,9-bis (octadecyloxy)-2,4,8,10-tetraoxy-3,9-diphosphaspiro[5.5] undecane, 3,9-bis(2,6-di-tert-butyl-4-methylphenoxy)-2,4,8,10-tetraoxa-3,9-diphosphaspiro[5.5]undecane, 2,2'-methylenebis(4,6-di-tert-butylphenyl) 2-ethylhexyl phosphite, tris(2,4-ditert-butylphenyl) phosphite, tris(nonylphenyl) phosphite, tetra-C12-15-alkyl(propane-2,2-diylbis(4,1-phenylene)) bis(phosphite), and 3,9-bis(2,6-di-tert-butyl-4-methylphenoxy)-2,4,8,10-tetraoxa-3,9-diphosphaspiro[5.5]undecane. Among these, 3,9-bis(2,6-di-tert-butyl-4-methylphenoxy)-2,4,8,10-tetraoxa-3,9-diphosphaspiro[5.5]undecane is preferable.

As such antioxidants, the aforementioned compounds may be used alone as a single type, or may also be used as a mixture of two or more types.

The antioxidant is preferably comprised in the thermoplastic resin composition in an amount of 1 ppm by weight to 3000 ppm by weight, with respect to the total weight of the resin composition. The content of the antioxidant in the thermoplastic resin composition is more preferably 50 ppm by weight to 2500 ppm by weight, further preferably 100 ppm by weight to 2000 ppm by weight, particularly preferably 150 ppm by weight to 1500 ppm by weight, and further particularly preferably 200 ppm by weight to 1200 ppm by weight.

[Release Agent]

The thermoplastic resin composition preferably comprises a release agent as an additive described above.

Examples of the release agent may include ester compounds including glycerin fatty acid esters such as mono/diglyceride of glycerin fatty acid, glycol fatty acid esters such as propylene glycol fatty acid ester and sorbitan fatty acid ester, higher alcohol fatty acid esters, full esters of aliphatic polyhydric alcohol and aliphatic carboxy acid, and monofatty acid esters. When an ester of aliphatic polyhydric alcohol and aliphatic carboxy acid is used as a release agent, any of a monoester, a full ester, and the like can be adopted. For example, those other than full esters, such as a monoester, may be used.

Specific examples of the release agent may include the following substances: namely,

- sorbitan fatty acid esters, such as sorbitan stearate, sorbitan laurate, sorbitan oleate, sorbitan trioleate, sorbitan tribehenate, sorbitan stearate, sorbitan tristearate, and sorbitan caprylate;
- propylene glycol fatty acid esters, such as propylene glycol monostearate, propylene glycol monooleate, propylene glycol monobehenate, propylene glycol monolaurate, and propylene glycol monopalmitate;
- higher alcohol fatty acid esters, such as stearyl stearate;
- glycerin fatty acid ester monoglycerides, which include: monoglycerides including glycerin monostearate, glycerin monohydroxystearate such as glycerin mono-12-hydroxystearate, glycerin monooleate, glycerin monobehenate, glycerin monocaprylate, glycerin monocaprate and glycerin monolaurate; and mono/diglycerides including glycerin mono/distearate, glycerin mono/distearate, glycerin mono/dibehenate, glycerin mono/dioleate;
- acetylated monoglycerides of glycerin fatty acid esters, such as glycerin diacetomonolaurate;
- organic acid monoglycerides of glycerin fatty acid esters, such as citric acid fatty acid monoglyceride, succinic acid fatty acid monoglyceride, and diacetyl tartaric acid fatty acid monoglyceride; and
- polyglycerin fatty acid esters, such as diglycerin stearate, diglycerin laurate, diglycerin oleate, diglycerin monostearate, diglycerin monolaurate, diglycerin monomyristate, diglycerin monooleate, tetraglycerin stearate, decaglycerin laurate, decaglycerin oleate, and polyglycerin polyricinoleate.

The release agent is preferably comprised in the thermoplastic resin composition in an amount of 1 ppm by weight to 5000 ppm by weight, with respect to the total weight of the resin composition. The content of the release agent in the thermoplastic resin composition is more preferably 50 ppm by weight to 4000 ppm by weight, further preferably 100 ppm by weight to 3500 ppm by weight, particularly preferably 500 ppm by weight to 13000 ppm by weight, and further particularly preferably 1000 ppm by weight to 2500 ppm by weight.

[Other Additives]

Additives other than the aforementioned antioxidant and release agent may also be added to the thermoplastic resin composition. Examples of the additives that may be comprised in the thermoplastic resin composition may include a compounding agent, a catalyst inactivator, a thermal stabilizer, a plasticizer, a filler, an ultraviolet absorber, a rust inhibitor, a dispersant, an antifoaming agent, a leveling agent, a flame retardant, a lubricant, a dye, a pigment, a bluing agent, a nucleating agent, and a clearing agent.

The content of additives other than the antioxidant and the release agent in the thermoplastic resin composition is preferably 10 ppm by weight to 5.0% by weight, more preferably 100 ppm by weight to 2.0% by weight, and further preferably 1000 ppm by weight to 1.0% by weight, but is not limited thereto.

The aforementioned additives are likely to adversely affect transmittance. Thus, it is preferable not to add such additives excessively, and more preferably, the total additive amount is, for example, within the aforementioned range.

In the method for producing the thermoplastic resin composition used in the present invention, after completion of the polymerization reaction, the catalyst may be removed or deactivated in order to retain heat stability and hydrolysis stability. However, it is not always necessary to deactivate the catalyst. When the catalyst is deactivated, a method of deactivating the catalyst by addition of a known acidic substance can be preferably carried out. Specific examples of the acidic substance that is preferably used herein may include: esters such as butyl benzoate; aromatic sulfonic acids such as p-toluenesulfonic acid; aromatic sulfonic acid esters, such as butyl p-toluenesulfonate and hexyl p-toluenesulfonate; phosphoric acids, such as phosphorous acid, phosphoric acid, and phosphonic acid; phosphorous acid esters, such as triphenyl phosphite, monophenyl phosphite, diphenyl phosphite, diethyl phosphite, di-n-propyl phosphite, di-n-butyl phosphite, di-n-hexyl phosphite, dioctyl phosphite, and monooctyl phosphite; phosphoric acid esters, such as triphenyl phosphate, diphenyl phosphate, monophenyl phosphate, dibutyl phosphate, dioctyl phosphate, and monooctyl phosphate; phosphonic acids, such as diphenyl phosphonate, dioctyl phosphonate, and dibutyl phosphonate; phosphonic acid esters such as diethyl phenyl phosphonate; phosphines, such as triphenylphosphine and bis(diphenylphosphino) ethane; boric acids, such as boric acid and phenyl borate; aromatic sulfonates, such as tetrabutylphosphonium dodecylbenzenesulfonate; organic halides, such as chloride stearate, benzoyl chloride, and p-toluenesulfonyl chloride; alkyl sulfates such as dimethyl sulfonate; and organic halogenates such as benzyl chloride. From the viewpoints of the effects of the deactivating agent, stability to the resin, and the like, p-toluenesulfonic acid or butyl sulfonate is particularly preferable. Such a deactivating agent is used in an amount of 0.01 to 50 times moles, and preferably 0.3 to 20 times moles, with respect to the amount of the catalyst. If the amount of the deactivating agent is smaller than 0.01 time mole with respect to the amount of the catalyst, deactivating effects unfavorably become insufficient. On the other hand, if the amount of the deactivating agent is larger than 50 times moles with respect to the amount of the catalyst, it is unfavorable that the heat resistance of the resin is decreased and the molded body is easily colored.

The kneading of the deactivating agent into the reaction product may be carried out immediately after completion of the polymerization reaction, or may also be carried out after the pelletizing of the resin following the polymerization. Moreover, in addition to the deactivating agent, other additives can be added by the same method as that described above.

<Optical Lens>

The optical lens of the present invention comprises the aforementioned thermoplastic resin or thermoplastic resin composition (hereinafter simply abbreviated as a "resin composition").

When an optical lens comprising the above-described resin composition is produced according to injection molding, the optical lens is preferably molded under conditions of a cylinder temperature of 200° C. to 350° C. and a mold temperature of 90° C. to 200° C. The optical lens is more preferably molded under conditions of a cylinder temperature of 230° C. to 300° C. and a mold temperature of 100° C. to 180° C. The mold temperature is particularly preferably 110° C. to 170° C. When the cylinder temperature is higher than 350° C., the resin composition is decomposed and colored. On the other hand, when the cylinder temperature is lower than 200° C., the melt viscosity becomes high, and it easily becomes difficult to mold the optical lens. Moreover, when the mold temperature is higher than 200° C., it easily becomes difficult to remove a molded piece consisting of the resin composition from a mold. On the other hand, when the mold temperature is lower than 90° C., the resin is hardened too quickly in a mold upon the molding thereof, and it becomes difficult to control the shape of a molded piece, or it easily becomes difficult to sufficiently transcribe a vehicle placed in a mold.

Since the optical lens produced using the above-described resin composition has a high refractive index and is excellent in terms of heat resistance, it can be used in fields in which expensive glass lenses having a high refractive index have been conventionally used, such as telescopes, binoculars and TV projectors, and thus, the optical lens produced using the present resin composition is extremely useful.

For instance, regarding a lens used for smart phones, a lens molded from a thermoplastic resin comprising the aforementioned constituent units (A) and (B) or the aforementioned constituent units (A), (B) and (C) is overlapped with a lens molded from a resin comprising a constituent unit derived from a monomer represented by any one of the following formulae, so that the lenses can be used as a lens unit:

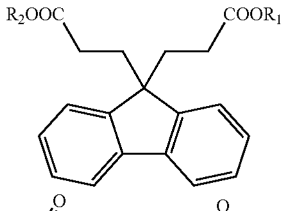

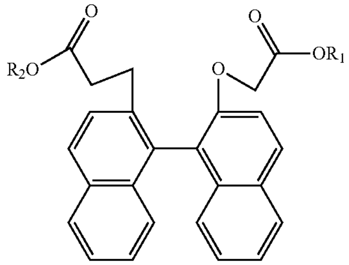

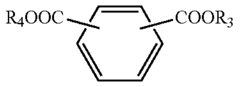
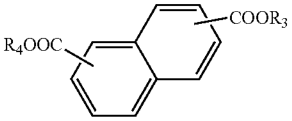

wherein $R_1$ and $R_2$ each independently represent a hydrogen atom, a methyl group or an ethyl group, and $R_3$ and $R_4$ each independently represent a hydrogen atom, a methyl group, an ethyl group or alkylene glycol containing 2 to 5 carbon atoms.

The optical lens of the present invention is preferably used in the shape of an aspherical lens, as necessary. Since the aspherical lens can reduce spherical aberration to substantially zero with a single lens thereof, it is not necessary to eliminate the spherical aberration by a combination of a plurality of spherical lenses, and thereby, it becomes possible to achieve weight saving and a reduction in production costs. Therefore, among the optical lenses, the aspherical lens is particularly useful as a camera lens.

Moreover, since the optical lens of the present invention has high molding fluidity, the present optical lens is particularly useful as a material of a thin and small optical lens having a complicated shape. Regarding the specific size of a lens, the thickness of the central portion is preferably 0.05 to 3.0 mm, more preferably 0.05 to 2.0 mm, and further preferably 0.1 to 2.0 mm. In addition, the diameter is preferably 1.0 mm to 20.0 mm, more preferably 1.0 to 10.0 mm, and further preferably, 3.0 to 10.0 mm. Further, regarding the shape thereof, the optical lens of the present invention is preferably a meniscus lens, in which one surface is a convex, and the other surface is a concave.

The optical lens of the present invention is molded according to any given method such as die molding, cutting, polishing, laser machining, electrical discharge machining, or etching. Among these methods, die molding is more preferable in terms of production costs.

EXAMPLES

Hereinafter, the examples of the present invention will be shown together with comparative examples, and the contents of the invention will be described in detail. However, the present invention is not limited to these examples.

1) Refractive Index (nD)

A polycarbonate resin was molded according to JIS B 7071-2:2018, to obtain a V block, which was then used as a test piece. The refractive index was measured at 23° C. using the following refractometer.

Refractometer: KPR-3000, manufactured by Shimadzu Corporation

2) Abbe Number (ν)

The same test piece (V block) as that used in the measurement of a refractive index was used, and the refractive indexes at wavelengths of 486 nm, 589 nm, and 656 nm were measured at 23° C. using the following refractometer. Thereafter, the Abbe number was calculated according to the following equation.

Refractometer: KPR-3000, manufactured by Shimadzu Corporation $$\nu=(nD-1)/(nF-nC),$$

wherein nD: refractive index at a wavelength of 589 nm, nC: refractive index at a wavelength of 656 nm, and nF: refractive index at a wavelength of 486 nm.

3) Glass Transition Temperature (Tg)

The glass transition temperature (Tg) was measured according to JIS K7121-1987, using the following differential scanning calorimeter by a temperature-increasing program of 10° C./min.

Differential scanning calorimeter: X-DSC7000, manufactured by Hitachi High-Tech Science Corporation 4) Mass Change Percentage (%)

A polycarbonate resin was dried at 120° C. for 8 hours, and was then subjected to injection molding to obtain a disk-shaped test piece having a diameter of 50 mm and a thickness of 2 mm.

Molding Conditions;

Molding machine: Injection Molding Machine S-2000130A (30 tons), manufactured by FANUC CORPORATION Molding Conditions:

Cylinder temperature: Tg of polycarbonate resin+135° C.

Mold temperature: Tg of polycarbonate resin−15° C.

The weight of the obtained test piece was measured, and was set to be M0. Subsequently, the test piece was preserved for 72 hours in a constant-temperature and high-humidity machine, in which the temperature was set at 85° C. and the humidity was set at 85%. Thereafter, the weight of the test piece was measured, and was set to be M1. The mass change percentage (%) was calculated according to the following equation:

$$\text{Mass change percentage (\%)}=(M1-M0)/M0\times 100,$$

wherein

M1: the mass of the test piece after preservation at a temperature of 85° C. and at a humidity of 85% for 72 hours, and M0: the mass of the test piece before preservation at a temperature of 85° C. and at a humidity of 85% for 72 hours.

5) Dimensional Change Percentage (%)

A polycarbonate resin was dried at 120° C. for 8 hours, and was then subjected to injection molding to obtain a disk-shaped test piece having a diameter of 50 mm and a thickness of 2 mm.

Molding machine: Injection Molding Machine S-2000130A (30 tons), manufactured by FANUC CORPORATION Molding Conditions:

Cylinder temperature: Tg of polycarbonate resin+135° C.

Mold temperature: Tg of polycarbonate resin−15° C.

The length of the obtained test piece from the molding gate opening to the anti-gate opening was measured using an image dimensional measuring device, and was set to be L0. Subsequently, the test piece was preserved for 72 hours in a constant-temperature and high-humidity machine, in which the temperature was set at 85° C. and the humidity was set at 85%. Thereafter, the length of the test piece from the molding gate opening to the anti-gate opening was measured using image dimensional measuring device, and was set to be L1. The dimensional change percentage (%) was calculated according to the following equation:

$$\text{Dimensional change percentage (\%)}=(L1-L0)/L0\times 100,$$

wherein

L1: the length of the test piece from the molding gate opening to the anti-gate opening after preservation at a temperature of 85° C. and at a humidity of 85% for 72 hours, and L0: the length of the test piece from the molding gate opening to the anti-gate opening before preservation at a temperature of 85° C. and at a humidity of 85% for 72 hours.

Image dimensional measuring device: Image Dimension Measurement System, Head LM-1100, manufactured by Keyence

Example 1

Raw materials, namely, 8000 g (18.24 mol) of 9,9-bis[4-(2-hydroxyethoxy)phenyl]fluorene (BPEF) represented by the structural formula as shown below, 550 g (1.59 mol) of 1,3-bis[2-(4-hydroxyphenyl)-2-propyl]benzene (BPM) represented by the structural formula as shown below, 4375 g (20.42 mol) of diphenyl carbonate (DPC), and 1.2 ml of 0.10 mol/L sodium hydrogen carbonate aqueous solution ($2.2\times10^{-4}$ moles, namely, $6.0\times10^{-6}$ moles with respect to a total of 1 mol of dihydroxy compound) were placed in a 50-L reactor equipped with a stirrer and a distillation apparatus, and thereafter, the mixture was heated to 215° C. under a nitrogen atmosphere of 760 Torr over 1 hour, and was stirred. After that, the degree of pressure reduction was adjusted to 150 Torr over 15 minutes, and the reaction mixture was then retained under conditions of 215° C. and 150 Torr for 20 minutes, so that a transesterification reaction was carried out. Then, the temperature was further increased to 240° C. at a rate of 37.5° C./hr, and the reaction mixture was then retained at 240° C. at 150 Torr for 10 minutes. Thereafter, the degree of pressure reduction was adjusted to 120 Torr over 10 minutes, and the reaction mixture was then retained at 240° C. at 120 Torr for 70 minutes. Thereafter, the degree of pressure reduction was adjusted to 100 Torr over 10 minutes, and the reaction mixture was then retained at 240° C. at 100 Torr for 10 minutes. After that, the degree of pressure reduction was further decreased to 1 Torr or less over 40 minutes, and a polymerization reaction was then carried out under stirring at 240° C. at 1 Torr or less for 10 minutes. After completion of the reaction, nitrogen was introduced into the reactor, followed by pressurization. The generated polycarbonate resin was extracted, while pelletizing. The evaluation results of the obtained resin are shown in Table 1 below. The obtained resin was dried with a blast constant-temperature dryer, DRM420DD, manufactured by ADVANTEC, at 100° C. for 12 hours or more, and thereafter, the resin was injection-molded in Injection Molding Machine S-2000i30A manufactured by FANUC CORPORATION, at a cylinder temperature of 260° C. and at a mold temperature that was set to be 10° C. lower than the glass transition temperature of the resin, so as to obtain a lens with a diameter of 5 mm.

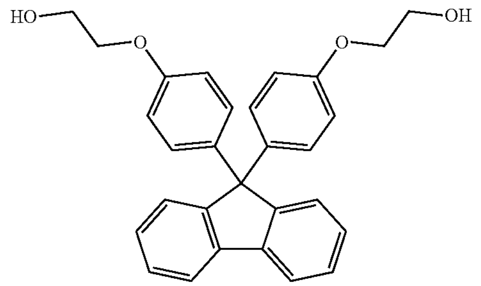

BPEF

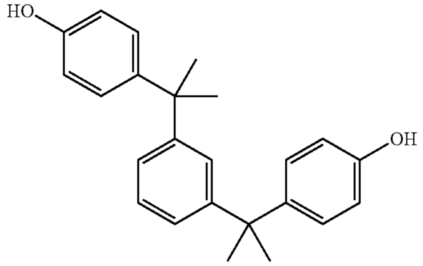

BPM

Examples 2 to 7 and Comparative Examples 1 to 5

Individual polycarbonate resins were obtained in the same manner as that of Example 1, with the exception that the raw materials shown in the following Table 2 are used.

The evaluation results of the obtained resins are shown in the following Table 1. It is to be noted that, in Comparative Examples 2 to 4, Tg was low, and the mass change percentage and the dimensional change percentage could not be measured.

TABLE 1

| | Molar rartio (A:B) between constituent unit (A) and constituent unit (B) | Constituent unit (A) BPM [mol %] | Constituent unit (B) BPEF [mol %] | Constituent unit (B) BPPEF [mol %] | Another constituent unit (C) BCFL [mol %] | Physical properties: Mass change percentage [%] | Dimensional change percentage [%] | Retractive index [—] | Abbe number [—] | Tg [° C.] |
|---|---|---|---|---|---|---|---|---|---|---|
| Comp. Ex. 1 | 0:100 | 0 | 100 | 0 | 0 | 0.48 | 0.062 | 1.640 | 23.5 | 145 |
| Ex. 1 | 8:92 | 8 | 92 | 0 | 0 | 0.47 | 0.058 | 1.636 | 23.9 | 141 |
| Ex. 2 | 30:70 | 30 | 70 | 0 | 0 | 0.43 | 0.048 | 1.625 | 25.1 | 132 |
| Ex. 3 | 50:50 | 50 | 50 | 0 | 0 | 0.36 | 0.043 | 1.614 | 26.4 | 124 |
| Ex. 4 | 77:23 | 48 | 14 | 0 | 38 | 0.37 | 0.022 | 1.617 | 25.7 | 148 |
| Ex. 5 | 10:90 | 10 | 0 | 90 | 0 | 0.46 | 0.032 | 1.651 | 21.7 | 151 |
| Ex. 6 | 32:68 | 32 | 0 | 68 | 0 | 0.35 | 0.023 | 1.642 | 22.7 | 141 |
| Ex. 7 | 70:30 | 70 | 0 | 30 | 0 | 0.30 | 0.021 | 1.613 | 26.4 | 121 |
| Comp. Ex. 2 | 80:20 | 80 | 20 | 0 | 0 | Low Tg, unmeasurable | | 1.597 | 28.9 | 112 |
| Comp. Ex. 3 | 80:20 | 80 | 0 | 20 | 0 | Low Tg, unmeasurable | | 1.605 | 27.9 | 115 |
| Comp. Ex. 4 | 90:10 | 90 | 10 | 0 | 0 | Low Tg, unmeasurable | | 1.591 | 30.0 | 109 |
| Comp. Ex. 5 | 0:100 | BPA = 48 BPM = 0 | 14 | 0 | 38 | 0.42 | 0.024 | 1.620 | 25.0 | 189 |

TABLE 2

| | | | | Another | | | | Another | Other raw materials | | |
|---|---|---|---|---|---|---|---|---|---|---|---|
| | Constituent unit (A) | Constituent unit (B) | | constituent unit (C) | Constituent unit (A) | Constituent unit (B) | | constituent unit (C) | | | Catalyst aqueous |
| | BPM | BPEF | BPPEF | BCFL | BPM | BPEF | BPPEF | BCFL | DPC | | solution |
| | [g] | [g] | [g] | [g] | [mol] | [mol] | [mol] | [mol] | [g] | [mol] | [ml] |
| Comp. Ex. 1 | 0 | 16000 | 0 | 0 | 0 | 36.49 | 0 | 0 | 8051 | 37.58 | 2.2 |
| Ex. 1 | 550 | 8000 | 0 | 0 | 1.59 | 18.24 | 0 | 0 | 4375 | 20.42 | 1.2 |
| Ex. 2 | 2709 | 8000 | 0 | 0 | 7.82 | 18.24 | 0 | 0 | 5750 | 26.84 | 1.6 |
| Ex. 3 | 6321 | 8000 | 0 | 0 | 18.24 | 18.24 | 0 | 0 | 8051 | 37.58 | 2.2 |
| Ex. 4 | 6360 | 2348 | 0 | 5500 | 18.36 | 5.35 | 0 | 14.53 | 8438 | 39.39 | 2.3 |
| Ex. 5 | 521 | 0 | 8000 | 0 | 1.50 | 0 | 13.54 | 0 | 3320 | 15.50 | 0.9 |
| Ex. 6 | 2900 | 0 | 10507 | 0 | 8.37 | 0 | 17.79 | 0 | 5788 | 27.02 | 1.6 |
| Ex. 7 | 4106 | 0 | 3000 | 0 | 11.85 | 0 | 5.08 | 0 | 3735 | 17.44 | 1.0 |
| Comp. Ex. 2 | 7325 | 2318 | 0 | 0 | 21.14 | 5.29 | 0 | 0 | 5833 | 27.23 | 1.6 |
| Comp. Ex. 3 | 7038 | 0 | 3000 | 0 | 20.31 | 0 | 5.08 | 0 | 5603 | 26.15 | 1.5 |
| Comp. Ex. 4 | 8000 | 1125 | 0 | 0 | 23.09 | 2.57 | 0 | 0 | 5661 | 26.43 | 1.5 |
| Comp. Ex. 5 | BPA = 4191<br>BPM = 0 | 2348 | 0 | 5500 | BPA = 18.36<br>BPM = 0 | 5.35 | 0 | 14.53 | 8438 | 39.39 | 2.3 |

Catalylst aqueous solution: 0.10 mol/L sodium hydrogen carbonate aqueous solution

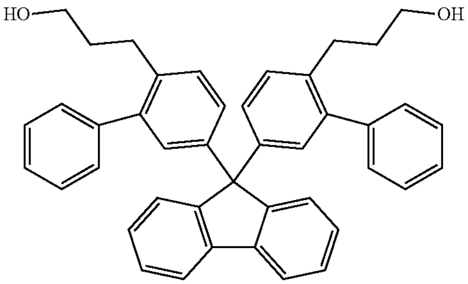

BPPEF

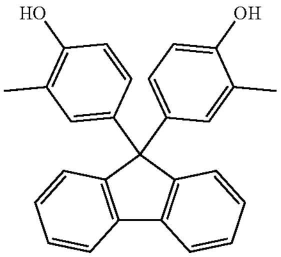

BCFL

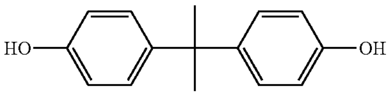

BPA

The invention claimed is:

1. An optical lens, comprising a thermoplastic resin consisting essentially of a constituent unit (A) derived from a monomer represented by the following general formula (1), and a constituent unit (B) derived from BPEF or BPPEF represented by each of the following structural formulae, wherein the molar ratio (A:B) between the constituent unit (A) and the constituent unit (B) is 5:95 to 79:21, (1)

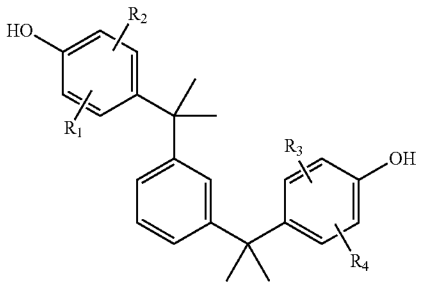

wherein $R_1$ to $R_4$ each independently represent a hydrogen atom, a halogen atom, an optionally branched alkyl group containing 1 to 10 carbon atoms, an alkoxy group containing 1 to 10 carbon atoms, or an aryl group containing 6 to 15 carbon atoms, and

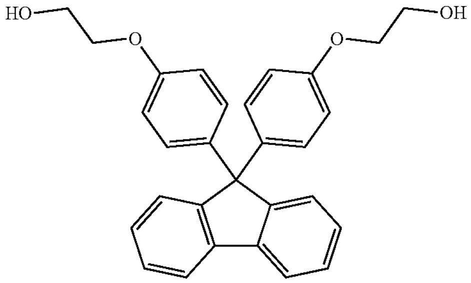

BPEF

-continued

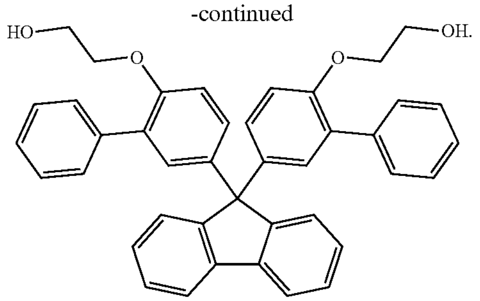

BPPEF and the thermoplastic resin further comprises a constituent unit (C) derived from BCFL represented by the following structural formula:

BCFL

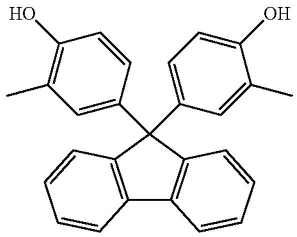

wherein the thermoplastic resin has a refractive index (nD) of 1.600 to 1.660 and an Abbe number of 21.0 to 27.0.

2. The optical lens according to claim 1, wherein the percentage of the constituent unit (A) in all constituent units in the thermoplastic resin is 5% to 50% by mole.

3. The optical lens according to claim 1, wherein the percentage of the constituent unit (B) in all constituent units in the thermoplastic resin is 11% to 95% by mole.

4. The optical lens according to claim 1, wherein the percentage of the constituent unit (C) in all constituent units in the thermoplastic resin is 0% to 50% by mole.

5. The optical lens according to claim 1, wherein the thermoplastic resin has Tg of 120° C. to 160° C.

6. The optical lens according to claim 1, wherein the thermoplastic resin has a mass change percentage of 0.47% or less.

7. The optical lens according to claim 1, wherein the thermoplastic resin has a dimensional change percentage of 0.060% or less.

* * * * *